(12) United States Patent
Nyström et al.

(10) Patent No.: US 10,029,208 B2
(45) Date of Patent: Jul. 24, 2018

(54) EXHAUST PURIFICATION SYSTEM

(71) Applicants: AIRQONE BUILDING SCANDINAVIA AB, Stockholm (SE); Anders Nyström, Stockholm (SE)

(72) Inventors: Anders Nyström, Stockholm (SE); Niclas Palm, Hedemora (SE)

(73) Assignee: AirQone Building Scandinavia AB, Stockholm (SE)

( * ) Notice: Subject to any disclaimer, the term of this patent is extended or adjusted under 35 U.S.C. 154(b) by 98 days.

(21) Appl. No.: 14/898,643

(22) PCT Filed: Jun. 18, 2014

(86) PCT No.: PCT/SE2014/000083
§ 371 (c)(1),
(2) Date: Dec. 15, 2015

(87) PCT Pub. No.: WO2014/204375
PCT Pub. Date: Dec. 24, 2014

(65) Prior Publication Data
US 2016/0114287 A1   Apr. 28, 2016

(30) Foreign Application Priority Data
Jun. 20, 2013  (SE) ...................... 1350757

(51) Int. Cl.
*B01D 53/32* (2006.01)
*B01D 53/92* (2006.01)
(Continued)

(52) U.S. Cl.
CPC .............. *B01D 53/32* (2013.01); *B01D 53/92* (2013.01); *F01N 3/08* (2013.01); *F01N 3/22* (2013.01);
(Continued)

(58) Field of Classification Search
None
See application file for complete search history.

(56) References Cited

U.S. PATENT DOCUMENTS

| | | | |
|---|---|---|---|
| 3,177,650 A | 4/1965 | Caruso | |
| 3,884,819 A * | 5/1975 | Schultz | B01D 53/26 422/186.09 |

(Continued)

FOREIGN PATENT DOCUMENTS

| | | |
|---|---|---|
| AT | 387158 | 5/1988 |
| EP | 1538312 | 6/2005 |

(Continued)

OTHER PUBLICATIONS

Moa Emling, European Search Report for associated application PCT/SE2014/000083, dated Sep. 30, 2014, Stockholm, Sweden.

*Primary Examiner* — Walter D. Griffin
*Assistant Examiner* — Jelitza M Perez
(74) *Attorney, Agent, or Firm* — Babcock IP, PLLC

(57) ABSTRACT

An exhaust purification system for purifying exhaust gas from a combustion engine comprising: an exhaust pipe (10) for the supply of exhaust gas; a pre-chamber (12) for receiving a flow of exhaust gas via a supply pipe (14); a supply valve (16) for controlling a flow of exhaust gas into the pre-chamber; at least one mixing chamber (18), in fluid connection with the pre-chamber for receiving the exhaust gas via the pre-chamber; an ionizing equipment (20) configured to ionize air, connected to the mixing chamber (18) so that ionized air is fed into the mixing chamber and is mixed with the exhaust gas; wherein the supply valve (16) is configured to be controlled based on a flow velocity of exhaust gas in the exhaust pipe (10).

16 Claims, 1 Drawing Sheet

(51) Int. Cl.
*F01N 3/08* (2006.01)
*F01N 3/22* (2006.01)

(52) U.S. Cl.
CPC .. *B01D 2257/404* (2013.01); *B01D 2257/502* (2013.01); *B01D 2257/504* (2013.01); *B01D 2257/702* (2013.01); *B01D 2259/80* (2013.01); *F01N 2240/36* (2013.01); *F01N 2240/38* (2013.01); *F01N 2270/10* (2013.01)

(56) References Cited

U.S. PATENT DOCUMENTS

| | | | |
|---|---|---|---|
| 5,560,201 A | 10/1996 | Fujishita et al. | |
| 9,021,792 B2* | 5/2015 | Hosoya | B01D 53/90 60/286 |
| 2004/0006975 A1* | 1/2004 | Stroia | B01D 53/9431 60/286 |
| 2006/0005531 A1 | 1/2006 | Calvo et al. | |

FOREIGN PATENT DOCUMENTS

| | | | |
|---|---|---|---|
| GB | 2256603 | 12/1992 | |
| WO | WO9847603 | 10/1998 | |
| WO | WO 9847603 A1 * | 10/1998 | B01D 53/32 |
| WO | 2010078442 | 7/2010 | |
| WO | WO 2012124531 A1 * | 9/2012 | B01D 53/90 |
| WO | 2013095295 | 6/2013 | |

\* cited by examiner

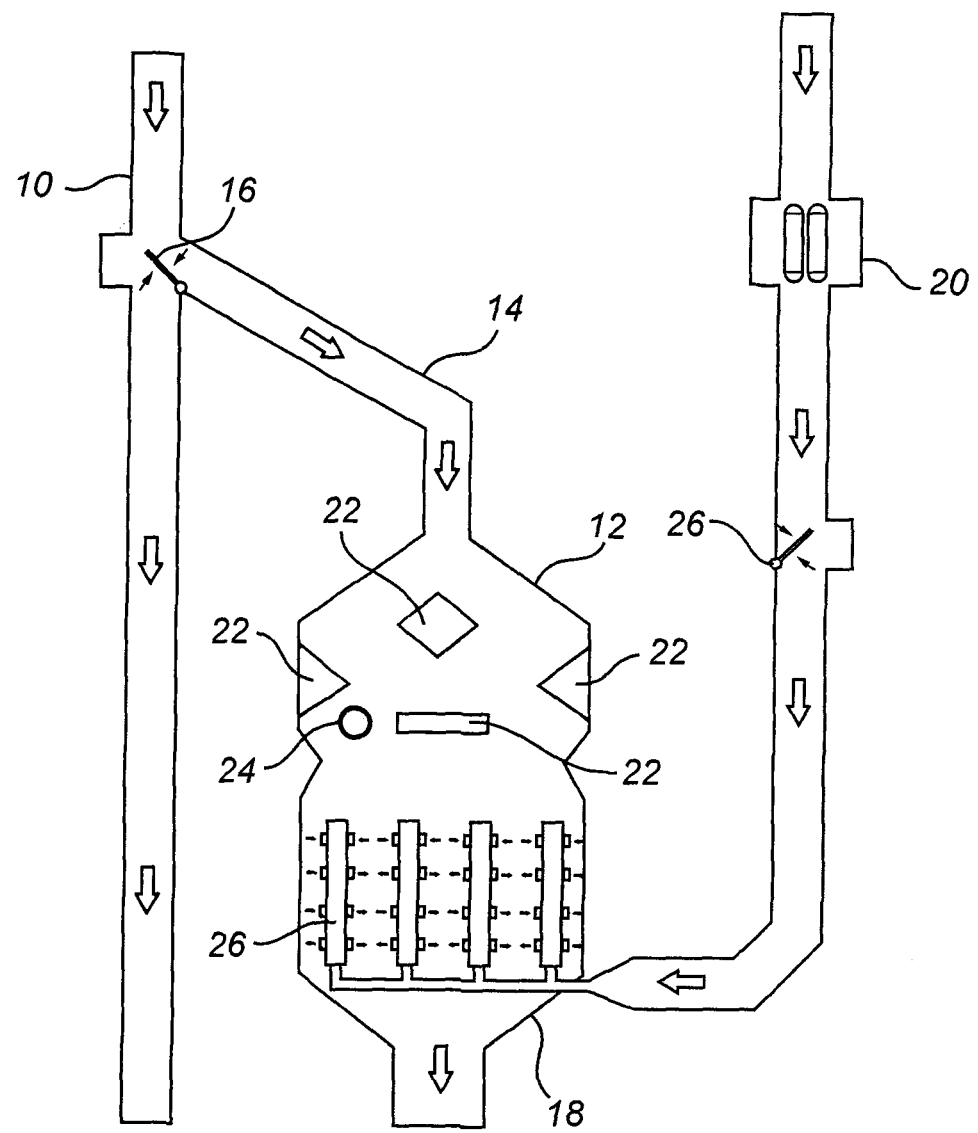

EXHAUST PURIFICATION SYSTEM

FIELD OF THE INVENTION

The present invention relates to a system for purification of exhaust gas in a vehicle.

TECHNICAL BACKGROUND

Due to environmental concerns and increasingly strict regulations, it is more and more important to reduce emissions from vehicles. This can be seen by the emergence of alternatives to the traditional combustion engine such as electric, fuel cell and hybrid engines. The development of alternative fuel sources is one approach for addressing the emissions.

However, it is highly likely that combustion engines will be present for a long time still, and large efforts are put into finding ways of reducing fuel consumption and exhaust emissions from combustion engines. However, many of the used methods and means for reducing emissions involve complex and costly development of the engine and related components. Further developments and improvements may therefore be limited by an increasing cost and complexity.

Accordingly, it is desirable to provide additional solutions for further reducing the emissions from combustion engines.

SUMMARY OF THE INVENTION

In view of the above-mentioned desired properties of a vehicle comprising a combustion engine, it is an object of the present invention to provide an improved exhaust purification system for reducing harmful emissions from vehicle exhaust gas.

According to a first aspect of the present invention, it is therefore provided an exhaust purification system for purifying exhaust gas from a combustion engine comprising: an exhaust pipe for the supply of exhaust gas; a pre-chamber for receiving a flow of exhaust gas via a supply pipe; a supply valve for controlling a flow of exhaust gas into the pre-chamber; at least one mixing chamber, in fluid connection with the pre-chamber for receiving the exhaust gas via the pre-chamber; an ionizing equipment configured to ionize air, connected to the mixing chamber so that ionized air is fed into the mixing chamber and is mixed with the exhaust gas; wherein the supply valve is controlled based on a velocity of exhaust gas in the exhaust pipe.

The present invention is based on the realization that to provide an improved exhaust purification system for purifying exhaust gas with ionizing air in a mixing chamber, it is important to control the flow of exhaust gas into the mixing chamber as the efficiency of the purification can be reduced if the flow of exhaust gas into the mixing chamber is too high. In particular, optimum purification efficiency can be achieved for a particular mix between exhaust gas and ionized air. Accordingly, it is advantageous to control the flow velocity of exhaust gas into the mixing chamber using a valve which is controlled based on the velocity of exhaust gas in the exhaust pipe. Thereby, the emission of contaminants from a combustion engine such as, but not limited to, $CO$, $NO_x$, $HC$ and $CO_2$ can be reduced.

According to one embodiment of the invention, the pre-chamber may advantageously comprise means for reducing the turbulence of exhaust gas in said pre-chamber. In addition to controlling the velocity of the exhaust gas entering the mixing chamber, a further improvement in purification efficiency can be provided if the flow of exhaust gas is even into the mixing chamber. By providing an even flow of exhaust gas into the mixing chamber, a more even mix between exhaust gas and ionized air can be achieved, thereby increasing the purification efficiency. The means for reducing turbulence may for example be plates or other structures suitably arranged in the pre-chamber.

According to one embodiment of the invention, the pre chamber may further comprise a pressure valve configured to release gas from the pre-chamber if a pressure within the pre-chamber exceeds a predetermined pressure value. An increased pressure in the pre-chamber may for example occur as a result of a sudden increase in flow of exhaust gas such that the supply valve does not have time to react and close. In such an event, the excessive pressure can be released by the pressure control valve until the supply valve has had time to control the flow back to an appropriate level.

In one embodiment of the invention, the ionizing equipment may advantageously be configured to ionize outside air. Alternatively, the ionizing equipment may be configured to ionize air provided by an air conditioning system of a vehicle. In addition to controlling the mix of exhaust gas and ionized air, it is also important to control the temperature in the mixing chamber for improving the purification efficiency. Thereby, it may be desirable to provide air to the ionization system which has been cooled by an air conditioning system of the vehicle as a means for controlling the temperature in the mixing chamber.

In one embodiment of the invention, the exhaust purification system may further comprise cooling means configured to cool air being provided to the ionizing equipment. It is for example possible to use cooling means such as heat exchangers for cooling air being provided to the ionization equipment.

According to one embodiment of the invention, the exhaust purification system may further comprise a temperature sensor configured to determine a temperature of the exhaust gas in the exhaust pipe, wherein an air flow from said ionization equipment into said mixing chamber is controlled based on a temperature of the exhaust gas. The flow of ionized air influences the degree of mixing in the mixing chamber. Hence, the flow of ionized air can be controlled to influence both the mixing degree and the temperatures in the mixing chamber.

In one embodiment of the invention the exhaust purification system may further comprise a temperature sensor configured to determine a temperature in the mixing chamber, wherein an air flow from the ionization equipment into the mixing chamber is controlled based on a temperature in the mixing chamber.

In one embodiment of the invention, the air flow from the ionization equipment into the mixing chamber may advantageously be controlled so that a temperature within the mixing chamber does not exceed a predetermined temperature value. The predetermined temperature value may for example be 70° C. as it is known that purification efficiency is improved for temperatures below 70° C.

According to one embodiment of the invention, the exhaust purification system may further comprise a flow sensor configured to determine a flow in the supply pipe, wherein the supply valve is controlled based on a determined flow so that a velocity of an exhaust gas flow into the pre-chamber is substantially constant. By maintaining the flow of exhaust gas into the pre-chamber substantially constant, a more even flow can be provided into the mixing chamber thereby providing a more even and predictable purification efficiency. The supply valve may also be controlled based of a flow measured in the exhaust pipe.

Furthermore, the supply valve may advantageously be controlled based on a determined flow in the supply pipe or in the exhaust pipe so that a velocity of an exhaust gas flow into the pre-chamber is maintained below a predetermined value.

According to one embodiment of the invention, the exhaust purification system may further comprise cooling means arranged between the supply valve and the mixing chamber, the cooling means being configured to reduce the temperature of exhaust gas being provided to the pre-chamber. In some circumstances, it may not be possible to maintain the temperature in the mixing chamber below a desired value only by mixing with ionized air. Thus, it may be advantageous to provide cooling means for cooing the exhaust gas prior to entry into the pre-chamber and subsequently into the mixing chamber for maintaining ad desired purification efficiency.

There is also provided a vehicle comprising an exhaust purification system according to any one of the aforementioned embodiments.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail with reference to the appended drawing showing an example embodiment of the invention, wherein:

FIG. 1 schematically illustrates an exhaust purification system according to an embodiment of the invention.

DETAILED DESCRIPTION OF PREFERRED EMBODIMENTS OF THE INVENTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 is a schematic illustration of an exhaust purification system according to an embodiment of the invention. The exhaust purification system receives exhaust gas from an exhaust pipe 10 of a vehicle. A supply valve 16 controls a flow of exhaust gas from the exhaust pipe 10 to a pre-chamber 12 via a supply pipe 14. The purpose of the pre-chamber 12 is to provide an even flow of exhaust gas into the mixing chamber 18 where ionized air is provided from an ionization equipment 20. Means for reducing turbulence 22 are arranged in the pre-chamber 12 so that irregularities in the flow of the exhaust gas entering the pre-chamber can be evened out. The means for reducing turbulence 22 can for example be plates or structures of other shapes arranged in the flow path of exhaust gas entering the pre-chamber.

Furthermore, a pressure valve 24 is arranged in the pre-chamber and the pressure valve 24 is configured to open and release exhaust gas if the pressure in the pre-chamber exceeds a predetermined value. That the pressure is increased in the pre-chamber can be a result of an increased flow of exhaust gas from the supply pipe 14, which in turn may be caused by an increased rpm of the engine, or example when accelerating the vehicle.

A valve 26 is also arranged between the ionization equipment 20 and the mixing chamber 18 for controlling a flow of ionized air into the mixing chamber. The ionized air is provided to the mixing chamber 18 via a plurality of pipes 26 comprising openings arranged such that an even distribution of ionized air is achieved in the mixing chamber 18.

The exhaust purification system may further comprise cooling means (not shown) for cooling the exhaust gas prior to reaching the pre-chamber. Cooling means may also be provided for cooling the ionized air and/or the air being provided to the ionizing equipment 20. Any type of suitable cooling or heat exchanging element known by the person skilled in the art may be used to reduce the temperature of a flow of exhaust gas or air in order to maintain the temperature in the mixing chamber below a predetermined temperature. Furthermore, the ionizing equipment 20 may receive a portion or all of the incoming air from an air conditioning system of the vehicle, for example depending on the temperature of outside air. Moreover, means for controlling the flow or air from the ionization equipment 20 may advantageously be provided, either arranged before or after the ionization equipment 20. Such means may for example be a separately arranged fan, or in the case when air is provided to the ionization equipment from an air conditioning system, the flow of air may be controlled by fans integrated in such a system.

The degree of exhaust gas which is provided towards the mixing chamber 18 by the supply valve 16 is determined by the flow velocity of the exhaust gas in relation to the capacity of the mixing chamber. Typically, an exhaust purification system may advantageously be dimensioned so that all exhaust gas is directed to the mixing chamber 18 when the engine is in an idle state or is operating at a low rpm. This may lead to a significant reduction of emission for example for a vehicle in dense traffic. There is a natural trade-off between the size and capacity of the system. Thereby, a larger system having a higher purification capacity may for example be installed in vehicles such as trucks or busses where the additional weight of the system would be of less importance.

The exhaust purification system according to various embodiments of the invention is further advantageous as it can be retrofitted to existing vehicles comprising combustion engines, thereby providing a possibility to in a relatively simple manner reduce emissions of existing vehicles.

Even though the invention has been described with reference to a specific exemplifying embodiment thereof, many different alterations, modifications and the like will become apparent for those skilled in the art. For example, the person skilled in the art readily realizes that the capacity of the exhaust purification can be varied in many different ways depending on the application at hand. For example, several ionization equipments may be arranged in parallel, the size of the mixing chamber may be varied and so on.

Also, it should be noted that parts of the system may be omitted, interchanged or arranged in various ways, the exhaust purification system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

We claim:

1. An exhaust purification system for purifying exhaust gas from a combustion engine comprising:
    an exhaust pipe (10) for the supply of exhaust gas;
    a pre-chamber (12) for receiving a flow of exhaust gas via a supply pipe (14), wherein said pre chamber further comprises a pressure valve configured to release gas from said pre-chamber if a pressure within said pre-chamber exceeds a predetermined pressure value;
    a supply valve (16) for controlling a flow of exhaust gas into said pre-chamber;
    at least one mixing chamber (18), in fluid connection with said pre-chamber for receiving said exhaust gas via said pre-chamber;
    an ionizing equipment (20) configured to ionize air, connected to said mixing chamber (18) so that ionized air is fed into said mixing chamber and is mixed with said exhaust gas;
    wherein said supply valve (16) is configured to be controlled based on a flow velocity of exhaust gas in said exhaust pipe (10).

2. The exhaust purification system according to claim 1, wherein said supply valve is configured so that a flow velocity of an exhaust gas flow into said pre-chamber does not exceed a predetermined velocity value.

3. The exhaust purification system according to claim 1, wherein said pre-chamber (12) comprises means (22) for reducing the turbulence of exhaust gas in said pre-chamber (12).

4. The exhaust purification system according to claim 1, wherein said ionizing equipment (20) is configured to ionize outside air.

5. The exhaust purification system according to claim 1, wherein said ionizing equipment (20) is configured to ionize air provided by an air conditioning system of a vehicle.

6. The exhaust purification system according to claim 1, further comprising cooling means configured to cool air being provided to said ionizing equipment (20).

7. The exhaust purification system according to claim 1, further comprising a temperature sensor configured to determine a temperature of said exhaust gas in said exhaust pipe (10), wherein an air flow from said ionizing equipment (20) into said mixing chamber (12) is controlled based on a temperature of said exhaust gas.

8. The exhaust purification system according to claim 1, further comprising a temperature sensor configured to determine a temperature in said mixing chamber (12), wherein an air flow from said ionizing equipment (20) into said mixing chamber is controlled based on a temperature in said mixing chamber.

9. The exhaust purification system according to claim 7, wherein said air flow from said ionizing equipment into said mixing chamber is controlled so that a temperature within said mixing chamber does not exceed a predetermined temperature value.

10. The exhaust purification system according to claim 9, wherein said predetermined temperature value is 70° C.

11. The exhaust purification system according to claim 1, further comprising a flow sensor configured to determine a flow in said supply pipe (14), wherein said supply valve is controlled based on a determined flow so that a velocity of an exhaust gas flow into said pre-chamber is substantially constant.

12. The exhaust purification system according to claim 1, further comprising a flow sensor configured to determine a flow in said exhaust pipe (10), wherein said supply valve is controlled based on a determined flow in said exhaust pipe so that a velocity of an exhaust gas flow into said pre-chamber is substantially constant.

13. The exhaust purification system according to claim 1, further comprising cooling means arranged between said supply valve (16) and said mixing chamber (18), said cooling means being configured to reduce the temperature of exhaust gas being provided to said pre-chamber.

14. A vehicle comprising an exhaust purification system according to claim 1.

15. An exhaust purification system for purifying exhaust gas from a combustion engine comprising:
    an exhaust pipe for the supply of exhaust gas;
    a pre-chamber for receiving a flow of exhaust gas via a supply pipe;
    a supply valve for controlling a flow of exhaust gas into said pre-chamber;
    at least one mixing chamber, in fluid connection with said pre-chamber for receiving said exhaust gas via said pre-chamber;
    an ionizing equipment configured to ionize air, connected to said mixing chamber so that ionized air is fed into said mixing chamber and is mixed with said exhaust gas, wherein said ionizing equipment is configured to ionize air provided by an air conditioning system of a vehicle;
    wherein said supply valve is configured to be controlled based on a flow velocity of exhaust gas in said exhaust pipe.

16. An exhaust purification system for purifying exhaust gas from a combustion engine comprising:
    an exhaust pipe for the supply of exhaust gas;
    a pre-chamber for receiving a flow of exhaust gas via a supply pipe;
    a supply valve for controlling a flow of exhaust gas into said pre-chamber;
    at least one mixing chamber, in fluid connection with said pre-chamber for receiving said exhaust gas via said pre-chamber;
    an ionizing equipment configured to ionize air, connected to said mixing chamber so that ionized air is fed into said mixing chamber and is mixed with said exhaust gas;
    wherein said supply valve is configured to be controlled based on a flow velocity of exhaust gas in said exhaust pipe;
    the exhaust purification system further comprising cooling means arranged between said supply valve and said mixing chamber, said cooling means being configured to reduce the temperature of exhaust gas being provided to said pre-chamber.

* * * * *